United States Patent Office 3,421,603
Patented Jan. 14, 1969

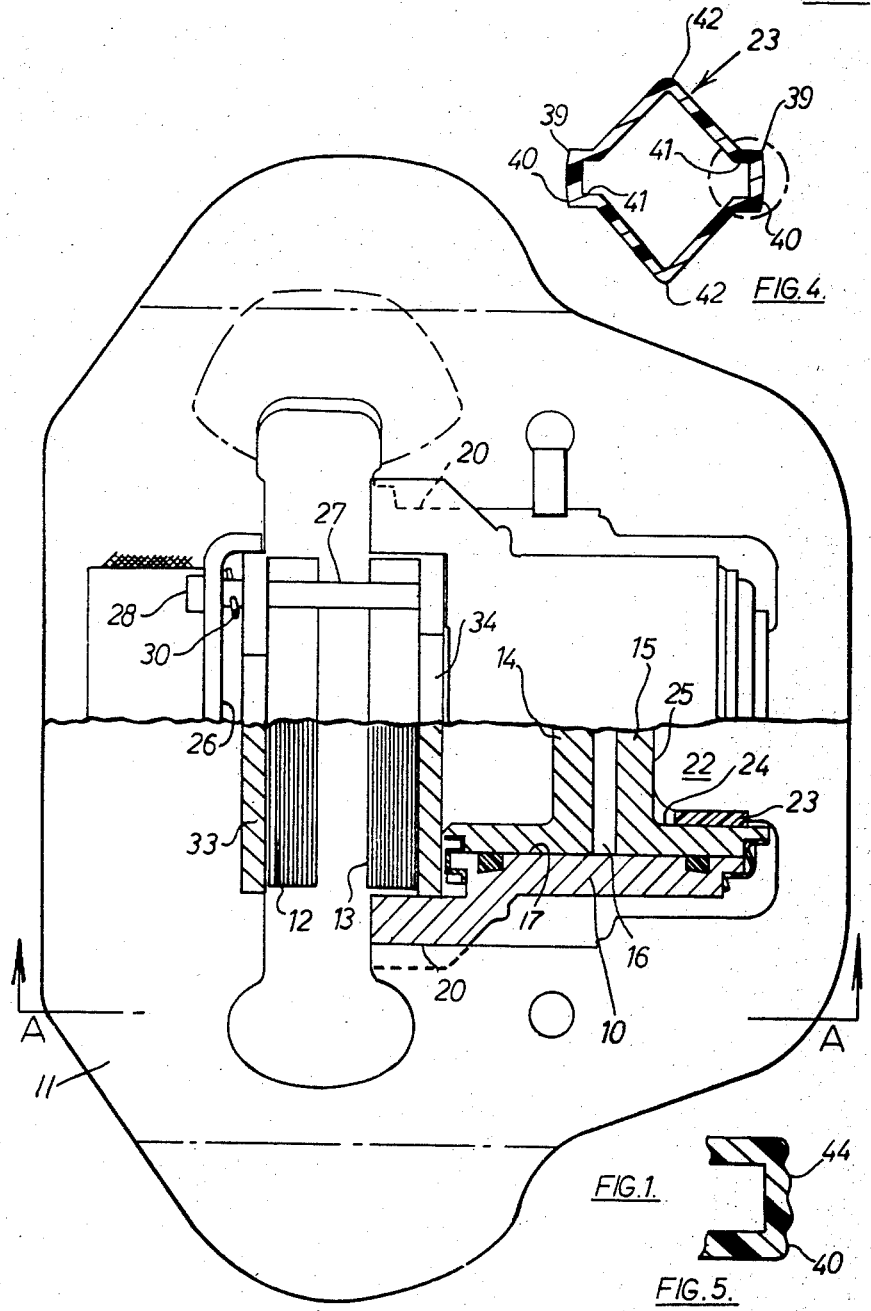

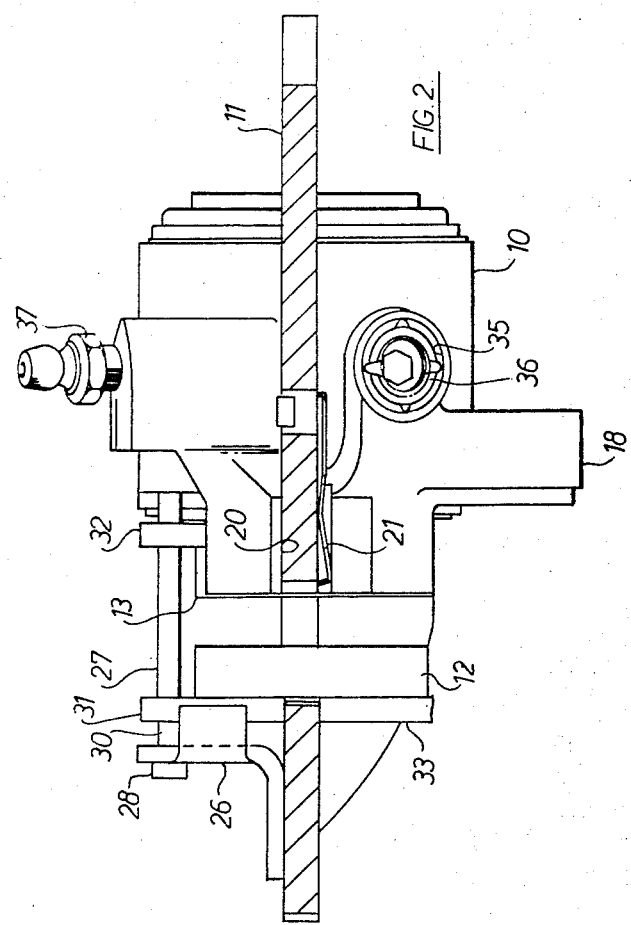

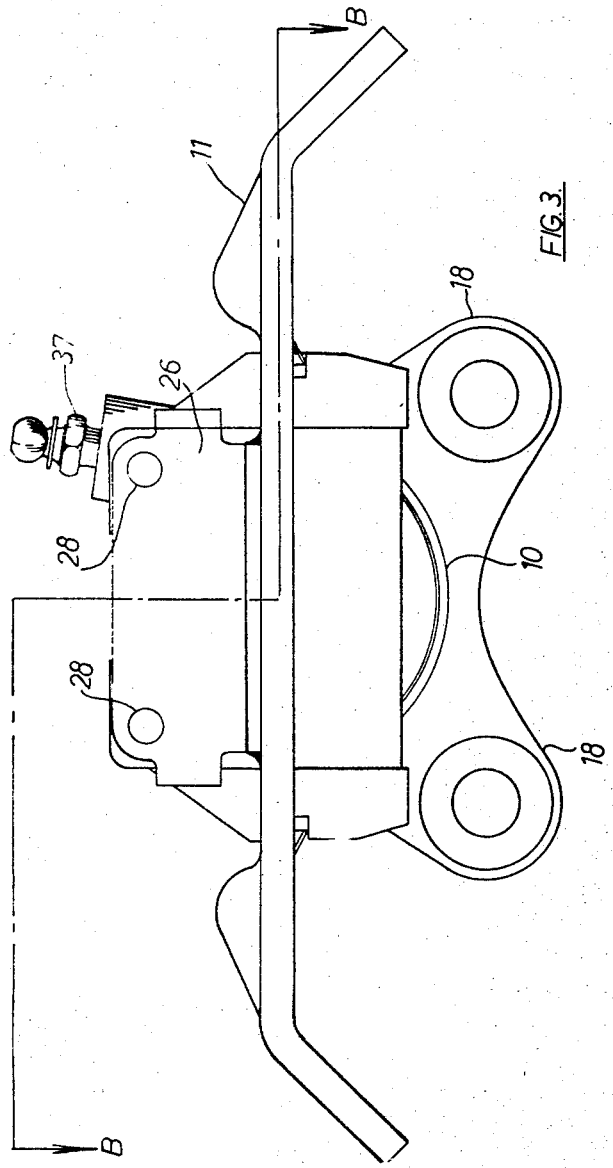

3,421,603
CLOSED LOOP DISC BRAKE
Gerhard Ernst Ludwig Otto Schuchmann, Stromberg, Heinrich Bernhard Rath, Koblenz-Luetzel, and Hermann Hans Hoenick, Immendorf, Germany, assignors to Girling Limited, Birmingham, Warwickshire, England
Filed Nov. 15, 1966, Ser. No. 594,459
Claims priority, application Great Britain, Nov. 15, 1965, 48,284/65
U.S. Cl. 188—73     11 Claims
Int. Cl. F16d 55/00

ABSTRACT OF THE DISCLOSURE

The invention provides a spot type disc brake in which a yoke of plate-like material is slidably received in longitudinal grooves at opposite sides of a body member containing a hydraulic actuator operative between a directly operated pad and the yoke which actuates an indirectly operated pad. A movable component of the actuator, such as a piston, contains a blind bore in which a flat tongue on the yoke is located by an insert of low friction plastics material, such as P.T.F.E.

---

The present invention relates to a spot type disc brake provided with a hydraulic actuator operative between a directly operated pad and a yoke adapted to support an indirectly operated pad as described in United States Patent No. 3,245,500.

According to the present invention, an operative component of the actuator has a cylindrical bore in which a ring-like insert member is received, said insert member being adapted to support and locate an inwardly directed tongue formed on said yoke.

Said insert member is preferably moulded from a synthetic plastics material having anti-friction properties, such as polypropylene or nylon. The insert member is conveniently of generally square configuration but with two opposite corners shaped to provide grooves for slidably receiving the side edges of the tongue on the yoke. The diagonal dimenison between the other two opposite corners is preferably slightly greater than the diameter of said bore so that the insert member is permanently stressed when in position whereby to avoid any play.

The invention is further described, by way of example, with reference to the accompanying drawings, in which:

FIG. 1 is a plan view, half sectioned on the line B—B of FIG. 3, of a spot type disc brake constructed in accordance with the invention;

FIG. 2 is a section on the line A—A of FIG. 1;

FIG. 3 is a front elevation of the brake;

FIG. 4 is an elevation of an insert member of the brake; and

FIG. 5 is an enlarged detail of the insert member.

Referring to the drawings, a spot type disc brake comprises a body member 10, a yoke 11 adapted to support an indirectly operated pad 12 and a hydraulic actuator formed within the body member 10 and operative between the yoke 11 and a directly operated pad 13. The hydraulic actuator comprises a pair of opposed pistons 14 and 15 slidable within a cylinder 16 constituted by a through bore 17 in the body member 10.

The body member 10 has a pair of mounting lugs 18 adapted to be bolted to a torque plate or other fixed part of the wheel mounting (not shown) adjacent a disc (also not shown) so that the disc periphery extends between the pads 12, 13. The yoke 11 is formed from plate-like materials suitably bent to shape as shown. The body member 10 has a pair of longitudinal grooves 20 formed at opposite sides thereof in which grooves the inside edges of the yoke 11 are guided with clearance. A spring 21 acts between one wall of each groove 20 and the yoke to urge the yoke against the other walls of the grooves 20 to avoid spragging. The yoke 11 is also located in the piston 15 by an inwardly extending flat tongue 22 formed integrally with the yoke and supported by a ring-like insert member 23 in a blind bore 24 in the piston 15. The base 25 of the blind bore 24 abuts the end of the tongue 22 to transmit the hydraulically produced force acting on the piston 15 to the yoke 11 and so to the indirectly operated pad 12.

A bracket 26 is secured to the yoke 11 adjacent the pad 12 and supports a pair of pad-retaining pins 27 whose other ends are slidably received in suitable bores in the body member 10. The pins 27 have heads 28 to prevent the pins passing right through the bracket 26 and clips 30 hold the pins 27 captive on the brackets 26. Lugs 31 and 32 formed on backing plates 33 and 34 respectively on the pads 12 and 13 have apertures through which pass the pins 27 whereby the pads 12 and 13 are suspended and located in their appropriate positions. The inlet 35 to the hydraulic cylinder 16 is shown closed by a protective plug 36 which is, of course, removed before the appropriate brake conduit is applied to the inlet 35. A bleed screw 37 is provided at the top of the body member 10.

As can be seen more clearly in FIG. 4, the insert member 23, which is moulded from polypropylene having a low coefficient of friction, is a ring of generally square configuration. However, two opposite corners 39 are generally rounded at the outside 40 and are formed with grooves 41 at their insides. The grooves 41 receive the lateral edge portions of the tongue 22 and slidably engage the opposed faces and the opposed parallel side edges of the tongue 22. The diagonal distance between the other two opposite corners 42 is very slightly greater than the diameter of the bore 24 so that the insert member 23 is always in interference fit in the bore 24. Also, as can be seen more readily from FIG. 5, the rounded outside 40 of the two opposite corners 39 is formed with corrugations 44 which are capable of being compressed against the wall of the bore 24 when the opposite corners 42 are urged towards one another by the fitting of the member 23 in this bore. The corrugations 44 permit tolerance variations in the diameter of the bore 24.

The tongue 22 on the yoke 11 is received in the grooves 41 with only sufficient clearance to prevent binding. The tongue is, therefore, accurately located and supported by the piston 15.

Although the tongue 22 is shown as being supported in a bore formed in a piston of the hydraulic actuator, it is envisaged that the tongue 22 could be supported in a similar manner in a blind bore formed in another operative component of a hydraulic actuator, such as a cylinder member.

We claim:
1. In a spot type disc brake the combination comprising a body member, said body member having longitudinal grooves along opposite sides thereof, a yoke formed of plate-like material and having opposite inside edges thereof slidably guided in said longitudinal grooves, opposed directly and indirectly operated pads supported respectively on the yoke and on the body member, a hydraulic actuator in said body member and operative between said directly operated pad and said yoke, said actuator including a movable component bearing against said yoke at an end thereof remote from said indirectly operated pad, said movable component having a blind bore with a cylindrical wall and said yoke having at said last-mentioned end thereof an inwardly directed tongue projecting into said blind bore, said tongue having opposed flat faces and opposed parallel side edges, and a plastic insert member in said blind bore, said insert member having a plurality of circumferentially spaced apart guide portions and linking portions joining said guide portions to one another to form a ring encircling said tongue on said yoke, two of which plurality of guide portions are diametrically opposed to one another and have inner surfaces engaging said opposed faces and said side edges of said tongue and outer surfaces engaging said cylindrical wall of said bore, and two further of which guide portions lie on opposite sides of a diametral plane through the two first-mentioned guide portions, are spaced from said tongue and have outer surfaces engaging said cylindrical wall of said bore, said linking portions being spaced from said wall of said bore and from said tongue.

2. A spot type disc brake brake according to claim 1 in which the plastic of said insert member comprises a synthetic plastic material selected from the group consisting of nylon and polypropylene.

3. A spot type disc brake according to claim 1 in which an external dimension of said insert member as measured over said external surfaces thereof conforming to said cylindrical wall is greater when the insert member is in its free state than the diameter of said cylindrical wall whereby said insert member is stressed when in position in said bore.

4. A spot type disc brake according to claim 1 in which some of said internal and external surfaces of said insert member are corrugated.

5. A spot type disc brake according to claim 1 in which said insert member is of generally square configuration, said guide portions forming the corners of the square and said linking portions forming the sides of the square.

6. A spot type disc brake according to claim 1 in which the base of said blind bore in said movable component of said actuator bears against the end of said tongue on said yoke.

7. A spot type disc brake according to claim 1 in which the first two said guide portions have internal grooves formed therein, said inner surfaces engaging said tongue being in said internal grooves.

8. A spot type disc brake according to claim 7 in which the first two said guide portions having said internal grooves therein have corrugated outer surfaces thereon generally curved to conform to the wall of said blind bore.

9. A spot type disc brake according to claim 8 in which the free state external diagonal dimension between the two further said guide portions of said insert member is slightly greater than the diameter of said blind bore in said movable component whereby said insert member is stressed when in position in said bore.

10. A spot type disc brake according to claim 1 in which said movable component of said actuator comprises a first piston.

11. A spot type disc brake according to claim 10 in which said actuator includes a bore in said body member open at opposite ends thereof, said first piston being slidable in said bore, and a second piston slidable in said bore and bearing against said directly operated pad.

References Cited

UNITED STATES PATENTS

| | | |
|---|---|---|
| 2,970,869 | 2/1961 | Thomas. |
| 3,215,477 | 11/1965 | Arthur. |
| 3,245,500 | 4/1966 | Hambling et al. _____ 188—73 |

GEORGE E. A. HALVOSA, *Primary Examiner.*